(12) United States Patent
McMechan et al.

(10) Patent No.: US 7,579,302 B2
(45) Date of Patent: Aug. 25, 2009

(54) FRICTION REDUCER PERFORMANCE BY COMPLEXING MULTIVALENT IONS IN WATER

(75) Inventors: David E. McMechan, Duncan, OK (US); Rob E. Hanes, Jr., Austin, TX (US); Ian D. Robb, Duncan, OK (US); Thomas D. Welton, Duncan, OK (US); Karen L. King, Duncan, OK (US); Bobby J. King, Duncan, OK (US); Jiten Chatterji, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/879,423

(22) Filed: Jul. 17, 2007

(65) Prior Publication Data

US 2009/0023617 A1 Jan. 22, 2009

(51) Int. Cl.
*C09K 8/588* (2006.01)
*E21B 43/26* (2006.01)

(52) U.S. Cl. ............... 507/225; 166/308.1; 166/308.2; 166/308.3; 507/119; 507/120; 507/140; 507/145; 507/224; 507/269; 507/277

(58) Field of Classification Search ............ 507/225, 507/224, 119, 120, 269, 277, 140, 145; 166/308.1, 166/308.2, 308.3
See application file for complete search history.

(56) References Cited

U.S. PATENT DOCUMENTS

| | | | |
|---|---|---|---|
| 3,414,053 A * | 12/1968 | Treiber et al. ............ 166/270.1 |
| 4,351,673 A | 9/1982 | Lawson | |
| 4,381,950 A | 5/1983 | Lawson | |
| 4,539,122 A | 9/1985 | Son | |
| 4,666,528 A | 5/1987 | Arrington | |
| 4,888,121 A | 12/1989 | Dill | |
| 4,949,790 A | 8/1990 | Dill | |
| 5,160,631 A | 11/1992 | Frost | |
| 5,674,817 A | 10/1997 | Brezinski | |
| 6,506,711 B1 | 1/2003 | Shuchart | |
| 6,531,427 B1 | 3/2003 | Shuchart | |
| 6,746,611 B2 | 6/2004 | Davidson | |
| 6,784,141 B1 | 8/2004 | King | |
| 6,787,506 B2 | 9/2004 | Blair | |
| 6,987,083 B2 | 1/2006 | Phillippi | |
| 7,004,254 B1 | 2/2006 | Chatterji | |
| 7,117,943 B2 | 10/2006 | Harris | |
| 7,232,793 B1 | 6/2007 | King | |
| 2005/0194292 A1 * | 9/2005 | Beetge et al. ............... 208/391 |
| 2007/0135313 A1 | 6/2007 | King | |

OTHER PUBLICATIONS

Halliburton Production Optimization, Stimulation, AquaStim™ Water Frac Service, Advanced Technologies Focused on Improving Production from Unconventional Reservoirs, 2007 Halliburton, H05921 Jun. 2007.

Ceresa, Pretsch & Bakker, Direct Potentiometric Information on Total ionic Concentrations, 2000 American Chemical Society, Mar. 31, 2000, pp. 2050-2054.

Lauw, Leermakers & Stuart, On the Binding of Calcium by Micelles Composed of Carboxy-Modified Pluronics Measured by Means of Differential Potentiometric Titration and Modeled with a Self-Consistent-Field Theory, 2006 American Chemical Society, Nov. 2, 2006, pp. 10932-10941.

Oh, Kim, Lee, Rho, Cha & Nam, One-Component Room Temperature Vulcanizing-Type Silicone Rubber-Based Calcium-Selective Electrodes, Analytical Chemistry, vol. 68, No. 3, Feb. 1, 1996, pp. 503-508.

Thermo Electron Corporation, Orion Calcium Electrode Instruction Manual, #274997.001 Rev. E.

* cited by examiner

*Primary Examiner*—Timothy J. Kugel
(74) *Attorney, Agent, or Firm*—Robert A. Kent; Tumey, L.L.P.

(57) ABSTRACT

Embodiments relate to improving the performance of anionic friction reducing polymers in water containing multivalent ions. Exemplary embodiments relate to methods of improving the performance of anionic friction reducing polymers in a subterranean treatment, wherein the method comprises adding a complexing agent to water comprising multivalent ions. The method comprises adding the anionic friction reducing polymer to the water comprising the multivalent ions, wherein the anionic friction reducing polymer is added in an amount less than or equal to about 0.15% by weight of the water. The method comprises introducing the water comprising the multivalent ions, the complexing agent and the anionic friction reducing polymer into at least a portion of the subterranean formation such that the friction reducing polymer reduces energy loss due to turbulence in the water. The complexing agent complexes with at least a portion of the multivalent ions in the water such that the reduction of energy loss by the friction reducing polymer is improved.

20 Claims, No Drawings

FRICTION REDUCER PERFORMANCE BY COMPLEXING MULTIVALENT IONS IN WATER

BACKGROUND

The present invention relates to friction reducing polymers, and more particularly, to the use of complexing agents to improve the performance of anionic friction reducing polymers in water containing multivalent ions.

During the drilling, completion and stimulation of subterranean wells, treatment fluids are often pumped through tubular structures (e.g., pipes, coiled tubing, etc.). A considerable amount of energy may be lost due to turbulence in the treatment fluid. As a result of these energy losses, additional horsepower may be necessary to achieve the desired treatment. To reduce these energy losses, certain polymers (referred to herein as "friction reducing polymers") have been included in these treatment fluids. In general, friction reducing polymers are high molecular weight polymers, such as those having a molecular weight of at least about 2,500,000. Typically, friction reducing polymers may be linear and flexible (e.g., persistence length<10 nm). One example of a suitable friction reducing polymer is a polymer comprising acrylamide and acrylic acid.

An example of a stimulation operation that may utilize friction reducing polymers is hydraulic fracturing. Hydraulic fracturing is a process commonly used to increase the flow of desirable fluids, such as oil and gas, from a portion of a subterranean formation. In hydraulic fracturing, a fracturing fluid may be introduced into the subterranean formation at or above a pressure sufficient to create or enhance one or more factures in the formation. Enhancing a fracture may include enlarging a pre-existing fracture in the formation. To reduce frictional energy losses within the fracturing fluid, friction reducing polymers may be included in the fracturing fluid. One type of hydraulic fracturing treatment that may utilize friction reducing polymers is commonly referred to as "high rate water fracturing" or "slick water fracturing." As will be appreciated by those of ordinary skill in the art, fracturing fluids used in these high rate water fracturing systems are generally not gels. As used in this disclosure, the term "gel" refers to an interconnected assembly of macromolecules having temporary or permanent cross links and exhibiting an apparent yield point. As such, in high rate water fracturing, velocity rather than the fluid viscosity is relied on for proppant transport. Additionally, while fluids used in high rate water fracturing may contain a friction reducing polymer, the friction reducing polymer is generally included in the fracturing fluid in an amount sufficient to provide the desired friction reduction without gel formation. Gel formation would cause an undesirable increase in fluid viscosity that would, in return, result in increased horsepower requirements.

SUMMARY

The present invention relates to friction reducing polymers, and more particularly, to the use of complexing agents to improve the performance of anionic friction reducing polymers in water containing multivalent ions.

An exemplary embodiment of the present invention provides a method that comprises adding a complexing agent to water comprising multivalent ions. The method further comprises adding the anionic friction reducing polymer to the water comprising the multivalent ions, wherein the anionic friction reducing polymer is added in an amount equal to or less than about 0.15% by weight of the water. The method further comprises introducing at least a portion of the water comprising the multivalent ions, the complexing agent and the anionic friction reducing polymer into a subterranean formation such that the friction reducing polymer reduces energy loss due to turbulence in the water. The complexing agent complexes with at least a portion of the multivalent ions in the water such that the reduction of energy loss by the friction reducing polymer is improved.

Another exemplary embodiment of the present invention provides a method of improving performance of an anionic friction reducing polymer in a subterranean treatment. The method comprises adding a carbonate complexing agent to water comprising calcium ions, wherein the calcium ions are present in the water in a concentration of greater than about 10 millimoles per liter of the water. The method further comprises adding the anionic friction reducing polymer to the water comprising the multivalent ions, wherein the anionic friction reducing polymer is added in an amount equal to or less than about 0.15% by weight of the water, wherein the friction reducing polymer comprises acrylamide. The method further comprises introducing at least a portion of the water comprising the calcium ions, the carbonate complexing agent and the anionic friction reducing polymer into a subterranean formation such that the friction reducing polymer reduces energy loss due to turbulence in the water. The carbonate complexing agent complexes with the calcium ions in the water such that the concentration of the calcium ions is reduced to less than about 4.2 millimoles per liter of the water, thereby improving the reduction of energy loss by the friction reducing polymer.

Another exemplary embodiment of the present invention provides a method of fracturing a subterranean formation. The method comprises providing a treatment fluid comprising water, multivalent ions, a complexing agent and an anionic friction reducing polymer in an amount equal to or less than about 0.15% by weight of the treatment fluid, wherein the complexing agent complexes with the multivalent ions such that the multivalent ions are present in an amount of less than about 3 millimoles per liter of the treatment fluid. The method further comprises introducing at least a portion of the treatment fluid into the subterranean formation at a pressure sufficient to create or enhance on or more fractures in the subterranean formation, wherein the friction reducing polymer reduces energy loss due to turbulence in the treatment fluid.

Another exemplary embodiment of the present invention provides a treatment fluid. The treatment fluid comprises water, multivalent ions, a complexing agent, and an anionic friction reducing polymer in an amount equal to or less than about 0.15% by weight of the treatment fluid, wherein the complexing agent complexes with the multivalent ions such that the multivalent ions are present in an amount of less than about 3 millimoles per liter of the treatment fluid.

The features and advantages of the present invention will be apparent to those skilled in the art upon reading the following description of specific embodiments.

DESCRIPTION OF SPECIFIC EMBODIMENTS

The present invention relates to friction reducing polymers, and more particularly, to the use of complexing agents to improve the performance of anionic friction reducing polymers in water containing multivalent ions. While these methods may be suitable for use in a variety of subterranean treatments where friction reduction may be desired, they may be particularly useful in high rate water fracturing.

The treatment fluids prepared in accordance with exemplary embodiments of the present invention generally comprise water, an anionic friction reducing polymer and a complexing agent. The water generally contains multivalent ions. As previously discussed, treatment fluids are commonly prepared by adding one or more anionic friction reducing polymers to water. The anionic friction reducing polymers are included in the fluids to reduce energy losses due to turbulence within the treatment fluid. Those of ordinary skill in the art will appreciate that the source of water used to prepare the treatment fluids may contain multivalent ions. However, if water is used that contains a sufficient concentration of multivalent ions, the multivalent ions may undesirably interact with the anionic friction reducing polymers so as to reduce the effectiveness of the friction reducing polymers. Accordingly, to counteract these interactions between the anionic friction reducing polymers and the multivalent ions, higher concentrations of the friction reducing polymers can be included in the treatment fluids. In addition, the use of one or more complexing agents to control the multivalent ions in the water can improve the performance of the anionic friction reducing polymers. As such, reduced amounts of the anionic friction reducing polymers may be used to achieve the desired friction reduction in water containing multivalent ions.

The source of water used to prepare the treatment fluids in accordance with exemplary embodiments of the present invention generally comprises multivalent ions, for example, calcium ions, magnesium ions, iron ions, aluminum ions, barium ions and combinations thereof. The water may also comprise monovalent ions, such as sodium and potassium ions. In accordance with certain exemplary embodiments, the source of the water may include pond water or produced water that comprises multivalent ions. As will be appreciated by those of ordinary skill in the art, these sources of water may be utilized where alternative sources of water that are generally free of multivalent ions are unavailable. Multivalent ions also may be present where brines, such as sodium chloride brines or potassium chloride brines are used. Moreover, as previously mentioned, multivalent ions present in certain concentrations may undesirably interact with the anionic friction reducing polymers to reduce the polymers effectiveness for reducing friction. By way of example, the present technique may be suitable for use where the presence of the multivalent ions exhibits a measurable effect on the polymers effectiveness for reducing friction. The presence of the multivalent ions may become increasingly undesirable as the concentration exceeds about 1 millimole per liter.

As noted above, the treatment fluids in accordance with exemplary embodiments of the present invention comprise an anionic friction reducing polymer. Suitable anionic friction reducing polymers should reduce energy losses due to turbulence within the treatment fluid. Those of ordinary skill in the art will appreciate that the anionic friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable anionic friction reducing polymers may be at least about 2,500,000, as determined using intrinsic viscosities. In certain exemplary embodiments, the average molecular weight of suitable anionic friction reducing polymers may be in the range of from about 7,500,000 to about 20,000,000. Those of ordinary skill in the art will recognize that anionic friction reducing polymers having molecular weights outside the listed range may still provide some degree of friction reduction.

A wide variety of anionic friction reducing polymers may be suitable for use with the present technique. By way of example, suitable anionic friction reducing polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

One example of a suitable anionic friction reducing polymer is a polymer comprising acrylamide and acrylic acid. The acrylamide and acrylic acid may be present in the polymer in any suitable concentration. An example of a suitable polymer may comprise acrylamide in an amount in the range of from about 5% to about 95% and acrylic acid in an amount in the range of from about 5% to about 95%. Another example of a suitable polymer may comprise acrylamide in an amount in the range of from about 60% to about 90% by weight and acrylic acid in an amount in the range of from about 10% to about 40% by weight. Another example of a suitable polymer may comprise acrylamide in an amount in the range of from about 80% to about 90% by weight and acrylic acid in an amount in the range of from about 10% to about 20% by weight. Yet another example of a suitable polymer may comprise acrylamide in an amount of about 85% by weight and acrylic acid in an amount of about 15% by weight. As previously mentioned, one or more additional monomers may be included in the polymer comprising acrylamide and acrylic acid. By way of example, the additional monomer(s) may be present in the anionic friction reducing polymers in an amount up to about 20% by weight of the polymer.

Suitable anionic friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" is intended to refer to the acid form of the anionic friction reducing polymer, as well as its various salts.

As will be appreciated, the anionic friction reducing polymers suitable for use in the present technique may be prepared by any suitable technique. For example, the polymer comprising acrylamide and acrylic acid may be prepared through polymerization of acrylamide and acrylic acid or through hydrolysis of polyacrylamide (e.g., partially hydrolyzed polyacrylamide).

In addition, the anionic friction reducing polymers suitable for use in exemplary embodiments of the present invention may be used in any suitable form. By way of example, the anionic friction reducing polymers may be provided as emulsion polymers, solution polymers or in dry form. In some exemplary embodiments, the anionic friction reducing polymers may be provided in an oil external emulsion that comprises the friction reducing polymer dispersed in the continuous hydrocarbon phase (e.g., hydrocarbon solvents, etc.). An example of a suitable oil external emulsion that comprises a polymer of acrylamide and acrylic acid dispersed in the continuous phase is available from Halliburton Energy Services, Inc., under the name FR-56 friction reducer. In some embodiments, the anionic friction reducing polymers may be dispersed in an aqueous continuous phase at high concentrations. One of ordinary skill in the art will be able to select an appropriate form for the anionic friction reducing polymer for a particular application based on a number of factors, including handling, ease of dissolution to a dilute polymer system, cost, performance and environmental factors, among others.

The anionic friction reducing polymer should be included in the treatment fluids in an amount equal to or less than 0.15% by weight of the water present in the treatment fluid. In some embodiments, the anionic friction reducing polymers may be included in exemplary embodiments of the treatment fluids in an amount sufficient to reduce friction without gel formation upon mixing. By way of example, the treatment fluid comprising the anionic friction reducing polymer may not exhibit an apparent yield point. While the addition of an anionic friction reducing polymer may minimally increase the viscosity of the treatment fluids, the polymers are generally not included in the treatment fluids of the present invention in an amount sufficient to substantially increase the viscosity. For example, if proppant is included in the treatments fluids, velocity rather than fluid viscosity generally may be relied on for proppant transport. In some embodiments, the anionic friction reducing polymer may be present in an amount in the range of from about 0.01% to about 0.15% by weight of the treatment fluid. In some embodiments, the anionic friction reducing polymer may be present in an amount in the range of from about 0.025% to about 0.1% by weight of the treatment fluid.

As previously described, the inclusion of the friction reducing polymers in the exemplary treatment fluids should reduce the energy lost due to turbulence in the water. For example, the addition of the friction reducing polymer may reduce the pressure drop experienced by the water when traveling through a tubular structure (such as a pipe, coiled tubing, etc.) As will be appreciated, the pressure drop for water traveling through a pipe with a circular cross section may calculated with the following equation:

$$\Delta P_{water} = \frac{\rho V^2 L f}{2 g_c d} \quad (1)$$

wherein $\Delta P_{water}$ is the calculated pressure drop for the water, $\rho$ is density, V is the velocity of the water, L is pipe length, $g_c$ is the gravitational constant and d is the pipe diameter. The variable f may be calculated in accordance with the formula below for turbulent flow.

$$f = \left\{ -2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2} \quad (2)$$

wherein $\varepsilon$ is pipe roughness, d is the pipe diameter and $N_{Re}$ is the Reynold's Number (Shacham, M., *Isr. Chem. Eng.*, 8, 7E (1976)). Accordingly, a measured pressure drop of the water traveling at a velocity V through a pipe of length L and d after the addition of the friction reducing polymer may be compared to the calculated pressure drop for the water without the friction reducing polymer to determine a % Friction Reduction ("% FR") using the following equation:

$$\% \ FR = 1 - \frac{\Delta P_{measured}}{\Delta P_{water}} \quad (3)$$

In general, a % FR of greater than 50% may be achieved with the addition of certain of the anionic friction reducing polymers described above (such as the polymers comprising acrylamide) to water. As used herein, unless otherwise noted, the % FR is a ten minute average friction reduction for a pipe length L of 8 ft, a pipe diameter d of 0.554 inches, a pump rate of 8.25 gpm (+/−0.4 gpm), and a pipe roughness $\varepsilon$ of $1 \times 10^{-6}$ inches. Those of ordinary skill in the art will appreciate that the velocity V and Reynold's Number $N_{Re}$ can be readily calculated from these variables.

However, as previously discussed, the multivalent ions contained in the water used to prepare the treatment fluids in accordance with exemplary embodiments of the present invention may undesirably interact with the anionic friction reducing polymers. For example, the multivalent ions may reduce the effectiveness of the friction reducing polymers. However, the use of one or more complexing agents to control the multivalent ions in the water can improve the performance of the anionic friction reducing polymers. By forming complexes with the multivalent ions, the performance of the friction reducing polymers may be improved, for example, by preventing (and/or reducing) the undesirable interactions between the multivalent ions and the friction reducing polymers. Accordingly, in accordance with the present technique, one or more complexing agents may be added to the water containing multivalent ions. Exemplary embodiments of the present technique may provide a % FR of greater than 50% (and even greater than 60%) when using certain friction reducing polymers (such as the polymers comprising acrylamide) mixed with water having a calcium ion concentration of greater than 1 millimole per liter. For instance, the complexing agents may reduce the calcium ion concentration from greater than about 10 millimoles to less than about 3.5 millimoles and even to less than 1 millimole, such that the performance of the friction reducing polymer may be improved.

The complexing agents useful in exemplary embodiments of the present invention may be any of a variety of complexing agents suitable for complexing with the multivalent ions so as to remove them from active behavior in the treatment fluid. When added at equal normality to an approximately 0.15% by weight aqueous solution of calcium chloride by weight, a complexing agent suitable for use with the present technique should reduce calcium ion concentration below about 4.2 millimoles per liter of the water. Examples of suitable complexing agents include carbonates, phosphates, pyrophosphates, orthophosphates, citric acid, gluconic acid, glucoheptanoic acid, ethylenediaminetetraacetic acid ("EDTA"), nitrilotriacetic acid ("NTA") and combinations thereof. As will be appreciated, salts of certain complexing agents may also be suitable. By way of example, the sodium salt of EDTA, the sodium salt of NTA, and the sodium salt of citric acid may be suitable complexing agents. Examples of suitable phosphates include sodium phosphates. Examples of suitable carbonates include sodium carbonate and potassium carbonate. Those of ordinary skill in the art should appreciate that the specific complexing agents listed are merely exemplary, and that the present technique is applicable to other complexing agents suitable that could provide the above-listed calcium ion reduction. As will be appreciated, certain of the suitable complexing agents may have been used previously as scale inhibitors. Scale inhibitors, however, are typically not used in a manner that would control the multivalent ions in the water to improve friction reducer performance. For instance, scale inhibitors are generally used in a low dose to control or prevent scale deposition.

In general, the complexing agent should be included in an amount sufficient to provide the desired complexing with the multivalent ions. By way of example, the complexing agent may be included in an amount of from about 50% to about 200% of the normality of the multivalent ion (e.g., calcium ion) concentration in the water. In one exemplary embodiment, the complexing agent may be included at equinormality to the multivalent ion concentration. Those of ordinary skill in the art should be able to determine the concentration of the complexing agent to add to the water based on, among other things, the multivalent ions present and the particular complexing agent used.

Additional additives may be included in the treatment fluids used in exemplary embodiments of the present technique as deemed appropriate by one of ordinary skill in the art, with the benefit of this disclosure. Examples of such additives include corrosion inhibitors, proppant, gravel (such as in gravel-packing methods), fluid loss control additives, surfactants and combinations thereof. In fracturing embodiments, proppant may be included in the treatment fluids to prevent the fracture from completely closing when the hydraulic pressure is released.

Generally, the treatment fluids are not relying on viscosity for proppant transport. Where particulates (e.g., gravel, proppant, etc.) are included in the aqueous treatments fluids, the fluids rely on at least velocity to transport the particulates to the desired location in the formation. In some exemplary embodiments, the treatment fluids may have a viscosity up to about 10 centipoise ("cp"). In some exemplary embodiments, the treatment fluids may have a viscosity in the range of from about 0.7 centipoise ("cp") to about 10 cp. For the purposes of this disclosure, viscosities are measured at room temperature using a Fann® Model 35 viscometer at 300 rpm with a ⅕ spring.

The treatments fluids useful in accordance with exemplary embodiments of the present invention should typically have a pH that does not undesirably interact with the performance of the anionic friction reducing polymers. By way of example, the treatment fluids may have a pH in the range of from about 4 to about 10. Those of ordinary skill in the art will recognize that treatment fluids having a pH outside the listed range may be suitable for certain applications.

As will be appreciated, the treatment fluids comprising the water (with the multivalent ions), the anionic friction reducing polymer and the complexing agent may be used in any suitable subterranean treatment where friction reduction is desired. Such subterranean treatments may include, but are not limited to, drilling operations, stimulation treatments (e.g., fracturing treatments, acidizing treatments, fracture acidizing treatments) and completion operations. In the fracturing embodiments, the treatment fluid may be introduced into a subterranean formation at or above a rate sufficient to create or enhance at least one fracture in the subterranean formation. The compositions and methods of the present invention may be especially useful in high-rate water fracturing treatments. Those of ordinary skill in the art, with the benefit of this disclosure, will be able to recognize a suitable subterranean treatment where friction reduction may be desired.

An exemplary method of the present invention is a method of improving performance of a friction reducing polymer in subterranean treatments. The exemplary method includes adding a complexing agent to water comprising multivalent ions. The exemplary method further includes adding an anionic friction reducing polymer to the water comprising the multivalent ions. The exemplary method further includes introducing the water comprising the multivalent ions, the complexing agent and the friction reducing polymer into a subterranean formation. As will be appreciated, the complexing agent may be added to the water prior to, or in combination with, the addition of the anionic friction reducing polymers. In one exemplary embodiment, the anionic friction reducing polymer and/or the complexing agent may be added to the water on the fly. As used herein, the term "on the fly" refers to the introduction of one flowing stream into another flowing stream so that the two streams combine and mix while flowing together as a single stream. For example, the anionic friction reducing polymer may be introduced into the water containing the multivalent ions while the water is being introduced into a well bore.

As previously described, during the introduction the water into the subterranean formation, energy may be lost due to turbulence in the water. However, the addition of the friction reducing polymer to the water should reduce these energy losses. For example, the addition of the friction reducing polymer may reduce the pressure drop experienced by the water when traveling through a tubular structure. As previously described, however, the multivalent ions present in the water may undesirably interact with the anionic friction reducing polymer, thereby reducing their effectiveness. Accordingly, as also previously described, the complexing agents added to the water should complex with at least a portion of the multivalent ions present in the ion such that the friction reducing polymers reduction of energy losses is improved.

To facilitate a better understanding of the present technique, the following examples of some specific embodiments are given. In no way should the following examples be read to limit, or to define, the scope of the invention.

EXAMPLE 1

Calcium concentration tests were performed to determine the ability of certain additives to control calcium ions in water. As will be appreciated, calcium concentrations in solution can be measured by electrodes in an analogous way to the measurement of acid concentrations by pH electrodes. One major electrode manufacturer, Orion, produces such calcium electrodes that are used in conjunction with a standard appropriate pH meters. Measurement of calcium concentrations with calcium electrodes are described in Lauw,Y. et al., *On the Binding of Calcium by Micelles Composed of Carboxy-Modified Pluronics Measured by Means of Differential Potentiometric Titration and Modeled with a Self-Consistent-Field Theory*, 22(26) Langmuir, 10932-10941 (2006); A. Cersaa & E. Pretcsch, *Direct Potentiometric Information on Total Ionic Concentrations*, 72(9) Anal. Chem. 2050-2054 (2000); and Oh, B. K. et al., *One-Component Room Temperature Vulcanizing-Type Silicone Rubber-Based Calcium-Selective Electrodes*; 68(3) Anal. Chem., 503-508 (1996).

The concentrations of calcium in various aqueous solutions were measured using the Orion 97-20 electrode as specified by the manufacturer. The Orion 97-20 calcium electrode was calibrated using solutions of calcium chloride of $10^{-4}$, $10^{-3}$ and $10^{-2}$ molar concentrations; in addition solutions of 0.15% calcium chloride (corresponding to 0.0135 mol/l $Ca^{++}$ and a typical hard water calcium concentration) were used as starting systems to study the effect of various additives, such as carbonate ions. The calcium electrode is usually read as a millivolt output that has a slope of about 26-27 mV per decade of calcium concentration in the range of about $10^{-5}$ to $10^{-2}$ mol/l when working correctly. Readings were taken after about 2 minutes when they were stable. The temperature was ambient.

The procedure for testing the various additives was as follows: The calcium electrode was calibrated against the standard solutions of $10^{-4}$, $10^{-3}$ and $10^{-2}$ mol/l calcium chloride solutions; the electrode was then placed in 100 mls of 0.15% $CaCl_2$ solution and the millivolt reading (0 to −1 mV)

taken. An appropriate amount of the additive (to give equal normality of solution to the calcium chloride) was then added to the solution with stirring until it had completely dissolved. The electrode millivolt reading was then taken again. Readings were reproducible to ±1 mV.

A table of electrode readings of the 0.15% calcium chloride solution with various additives at equal normality is given below in Table 1. The lower calcium concentrations give a more negative millivolt reading.

TABLE 1

Calcium Concentration Tests

| Additive | Calcium electrode reading ± 1 mV | Free (Uncomplexed) Ca++ concentration mol/l |
|---|---|---|
| Sodium Carbonate | −40 | $4.4 \times 10^{-4}$ |
| Sodium Citrate | −17 | $3.1 \times 10^{-3}$ |
| Sodium Chloride | −2 | $1.35 \times 10^{-2}$ |
| Sodium Bicarbonate | −7 | $7.5 \times 10^{-3}$ |
| No additive | 0 | $1.35 \times 10^{-2}$ |

Accordingly, from Table 1, it should be noted that some additives complex more effectively with calcium than others. Those giving more than 10 mV decrease in the electrode reading starting with the 0.15% $CaCl_2$ solution and adding an equinormal amount of the additive are significantly better than those where the change in electrode reading is less than 10 mV.

EXAMPLE 2

A series of friction reduction tests were performed to determine the effect of the additives from Example 1 on the performance of anionic friction reducing polymers in water containing multivalent ions. In each of the tests, 0.5 gallon of FR-56 friction reducer per 1,000 gallons of deionized water was used. As previously mentioned FR-56 friction reducer is an oil external emulsion that contains a copolymer of acrylamide and acrylic acid dispersed in the continuous phase. Calcium chloride in an amount of 0.15% by weight was included in the tap water in Test Nos. 1-5 of Table 2. Test No. 6 was a control that did not include calcium chloride to determine the friction reduction achieved by FR-56 friction reducer in the absence of multivalent ions. In addition, one of the additives from Example 1 was included in the tap water in Test Nos. 2-6 of Table 2. The particular additive is provided below in Table 2.

These friction reduction tests were performed using a Friction Reduction Meter ("FR Meter") in accordance with the procedure listed below. The FR Meter was a closed loop pipeline apparatus designed to measure the pressure drop across an 8-foot section of a 12-foot Hastaloy pipe. The Hastaloy pipe had an inner diameter of 0.554 inches with a wall roughness of $1 \times 10^{-6}$ inches. The FR Meter included of a storage/mixing tank connected to a fixed speed progressive cavity pump which pumped the test fluid through a magnetic flow meter then through the test pipes and a return line to the storage/mixing tank.

For each test, about 10 liters of deionized water were added to the storage/mixing tank. The pump was run to circulate the water for an amount of time sufficient to fill all the pipes with water. Next, for Test Nos. 1-5, the calcium chloride was added to the storage/mixing tank with mixing by circulating until it had completely dissolved. For Test Nos. 2-5, an appropriate amount of the additive listed below in Table 2 (to give equal normality of solution to the calcium chloride) was then added to the storage/mixing tank with mixing by circulating until it had completely dissolved. For Test No. 6, 0.15% by weight of sodium chloride was added to the storage/mixing tank with mixing by circulating until it had completely dissolved. The data acquisition system was started, and the pump was started after about an additional 10 to 15 seconds. The data acquisition system measured the flow rate, tank temperature and pressure drop across the 8-foot section of pipe. At about 1 minute into the test, 0.5 gallon of FR-56 friction reducer was added to the storage/mixing tank. Each test was run for a total of about 20 minutes, with flow rate, tank temperature and pressure drop across the 8-foot section of pipe recorded at one-second intervals. The pump rate was about 30 liters per minute, or 3 system volumes per minute. For the commercial steel pipe, the flow was fully turbulent at a Reynolds Number of about 50,000.

The first minute of data that was collected prior to the addition of FR-56 friction reducer was used to verify instrument readings and provide a baseline of data with a known fluid. The pressure drop across the 8-foot section of pipe for the deionized water containing calcium chloride and/or a additive prior to the addition of the friction reducer, was calculated from the flow rate and pipe dimensions in accordance with the following formula:

$$\Delta P_{water} = \frac{\rho V^2 L f}{2 g_c d}$$

wherein $\Delta P_{water}$ is the calculated pressure drop for the deionized water, $\rho$ is density, V is the velocity, L is length, $g_c$ is the gravitational constant and d is the pipe diameter. The variables was calculated in accordance with the formula below for turbulent flow.

$$f = \left\{ -2\log\left[ \frac{\varepsilon/d}{3.7} - \frac{5.02}{N_{Re}} \log\left( \frac{\varepsilon/d}{3.7} + \frac{14.5}{N_{Re}} \right) \right] \right\}^{-2}$$

wherein $\varepsilon$ is pipe roughness, d is the pipe diameter and $N_{Re}$ is the Reynold's Number (Shacham, M., *Isr. Chem. Eng.*, 8, 7E (1976)).

Following the addition of FR-56 friction reducer to the tank, the measured, ten minute average pressure drop, was compared to the calculated pressure drop for the water to determine the Ten Minute Average % Friction Reduction ("% FR") using the following equation:

$$\% \ FR = 1 - \frac{\Delta P_{measured}}{\Delta P_{water}}$$

wherein $\Delta P_{water}$ is the calculated pressure drop for the water and $\Delta P_{measured}$ is the measured, ten minute average pressure drop after introduction of the oil-external emulsion polymer.

The results of the friction reduction tests are shown in Table 2 below. The start time for these measurements was when the FR-56 friction reducer was added to the storage/mixing tank. To illustrate the relationship between the calcium concentration and the friction reduction, the results of the calcium concentration tests are also provided on Table 2.

TABLE 2

Friction Reduction Tests

| Test | Base Fluid | FR56 Friction Reducer (gal/M gal) | Additive | 10-min Avg % FR | Free (Uncomplexed) Ca++ concentration mol/l |
|---|---|---|---|---|---|
| 1. | 0.15% CaCl$_2$ | 0.5 | — | 45.4 | $1.35 \times 10^{-2}$ |
| 2. | 0.15% CaCl$_2$ | 0.5 | Sodium Chloride | 47.3 | $1.35 \times 10^{-2}$ |
| 3. | 0.15% CaCl$_2$ | 0.5 | Sodium Bicarbonate | 47.5 | $7.5 \times 10^{-3}$ |
| 4. | 0.15% CaCl$_2$ | 0.5 | Sodium Citrate | 58.4 | $3.1 \times 10^{-3}$ |
| 5. | 0.15% CaCl$_2$ | 0.5 | Sodium Carbonate | 65.0 | $4.4 \times 10^{-4}$ |
| 6. | Water | 0.5 | Sodium Chloride | 63.6 | — |

Accordingly, from these friction reduction tests, it should be noted that the compounds (such as the sodium citrate and the sodium carbonate) that complex more effectively with the calcium ions improve the performance of the anionic friction reducing polymer in water containing multivalent ions. For instance, Test Nos. 4 and 5, which used a 0.15% by weight calcium chloride base fluid, provided comparable friction reduction to Test No. 6 that was performed in the absence of multivalent ions.

The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents and alternatives falling with the scope and spirit of the present invention as defined by the following appended claims. In addition, every range of values (of the form, "from about a to about b," or, equivalently, "from approximately a to b," or, equivalently, "from approximately a-b") disclosed in the present Description of Specific Embodiments is to be understood as referring to the power set (the set of all subsets) of the respective range of values, and set for the every range encompassed within the broader range of value.

What is claimed is:

1. A method of fracturing a subterranean formation, the method comprising:
   providing a treatment fluid comprising water, multivalent ions in an amount greater than about 10 millimoles per liter of the water, a complexing agent, and an anionic friction reducing polymer in an amount equal to or less than about 0.15% by weight of the treatment fluid, wherein the complexing agent is added to the water in an amount of from about 50% to about 200% of the normality of the multivalent ions in the water, wherein the complexing agent complexes with the multivalent ions such that free multivalent ions are present in an amount equal to or less than about 3 millimoles per liter of the treatment fluid, wherein the complexing agent is selected from the group consisting of a phosphate, a pyrophosphate, an orthophosphate, a citric acid, a gluconic acid, a glucoheptanoic acid, an ethylenediaminetetraacetic acid, a nitrilotriacetic acid, and combinations thereof; and
   introducing at least a portion of the treatment fluid into the subterranean formation at a pressure sufficient to create or enhance on or more fractures in the subterranean formation, wherein the friction reducing polymer reduces energy loss due to turbulence in the treatment fluid.

2. The method of claim 1, wherein the multivalent ions comprise calcium ions, wherein the anionic friction reducing polymer comprises acrylamide, and wherein the complexing agent complexes with the multivalent ions such that free multivalent ions in the water are present in an amount of less than about 1 millimole per liter of the treatment fluid.

3. The method of claim 1 wherein the complexing agent comprises the ethylenediaminetetraacetic acid.

4. The method of claim 1, wherein the anionic friction reducing polymer comprises acrylamide.

5. A treatment fluid comprising: water; multivalent ions in an amount greater than about 10 millimoles per liter of the water; a complexing agent; and an anionic friction reducing polymer in an amount equal to or less than about 0.15% by weight of the treatment fluid, wherein the complexing agent is present in an amount of from about 50% to about 200% of the normality of the multivalent ions in the water, wherein the complexing agent complexes with the multivalent ions such that free multivalent ions are present in an amount of less than about 3 millimoles per liter of the treatment fluid, wherein the complexing agent is selected from the group consisting of a phosphate, a pyrophosphate, an orthophosphate, a citric acid, a gluconic acid, a glucoheptanoic acid, an ethylenediaminetetraacetic acid, a nitrilotriacetic acid, and combinations thereof.

6. The treatment fluid of claim 5 wherein the complexing agent comprises the ethylenediaminetetraacetic acid.

7. The treatment fluid of claim 5, wherein the anionic friction reducing polymer comprises acrylamide.

8. A method comprising
   providing a treatment fluid comprising water, multivalent ions in an amount greater than about 10 millimoles per liter of the water, a complexing agent, and an anionic friction reducing polymer in an amount equal to or less than about 0.15% by weight of the treatment fluid, wherein the complexing agent is added to the water in an amount of from about 50% to about 200% of the normality of the multivalent ions in the water; and
   introducing the treatment fluid into a subterranean formation.

9. The method of claim 8, wherein the multivalent ions comprise calcium ions, wherein the anionic friction reducing polymer comprises acrylamide, and wherein the complexing agent complexes with the multivalent ions such that free multivalent ions in the water are present in an amount of less than about 1 millimole per liter of the treatment fluid.

10. The method of claim 8, wherein the complexing agent is selected from the group consisting of a carbonate, a phosphate, a pyrophosphate, an orthophosphate, a citric acid, a gluconic acid, a glucoheptanoic acid, an ethylenediaminetatracetic acid, a nitrilotriacetic acid, and combinations thereof.

11. The method of claim 8, wherein the complexing agent comprises a carbonate.

12. The method of claim 8, wherein the complexing agent complexes with the multivalent ions such that free multivalent ions are present in an amount equal to or less than about 3 millimoles per liter of the treatment fluid.

13. The method of claim 8, wherein the anionic friction reducing polymer comprises acrylamide.

14. The method of claim 8, wherein the treatment fluid is introduced into the subterranean formation at or above a pressure sufficient to create or enhance one or more fractures in the subterranean formation.

15. A method comprising
adding a complexing agent and an anionic friction reducing polymer to water comprising multivalent ions in an amount greater than about 10 millimoles per liter of the water, wherein the anionic friction reducing polymer is added in an amount equal to or less than about 0.15% by weight of the water, wherein the complexing agent is added to the water in an amount of from about 50% to about 200% of the normality of the multivalent ions in the water, and wherein the complexing agent is added to the water at the same time as the anionic friction reducing polymer is added to the water; and
introducing at least a portion of the water comprising the multivalent ions, the complexing agent, and the anionic friction reducing polymer into a subterranean formation.

16. The method of claim 15, wherein the complexing agent is selected from the group consisting of a carbonate, a phosphate, a pyrophosphate, an orthophosphate, a citric acid, a gluconic acid, a glucoheptanoic acid, an ethylenediaminetatracetic acid, a nitrilotriacetic acid, and combinations thereof.

17. The method of claim 15, wherein the complexing agent comprises a carbonate.

18. The method of claim 15, wherein the complexing agent complexes with the multivalent ions such that free multivalent ions are present in an amount equal to or less than about 3 millimoles per liter of the treatment fluid.

19. The method of claim 15, wherein the anionic friction reducing polymer comprises acrylamide.

20. The method of claim 15, wherein the water is introduced into the subterranean formation at or above a pressure sufficient to create or enhance one or more fractures in the subterranean formation.

* * * * *